W. M. FOLBERTH.
BRACKET.
APPLICATION FILED JAN. 15, 1921.
1,394,988.
Patented Oct. 25, 1921.
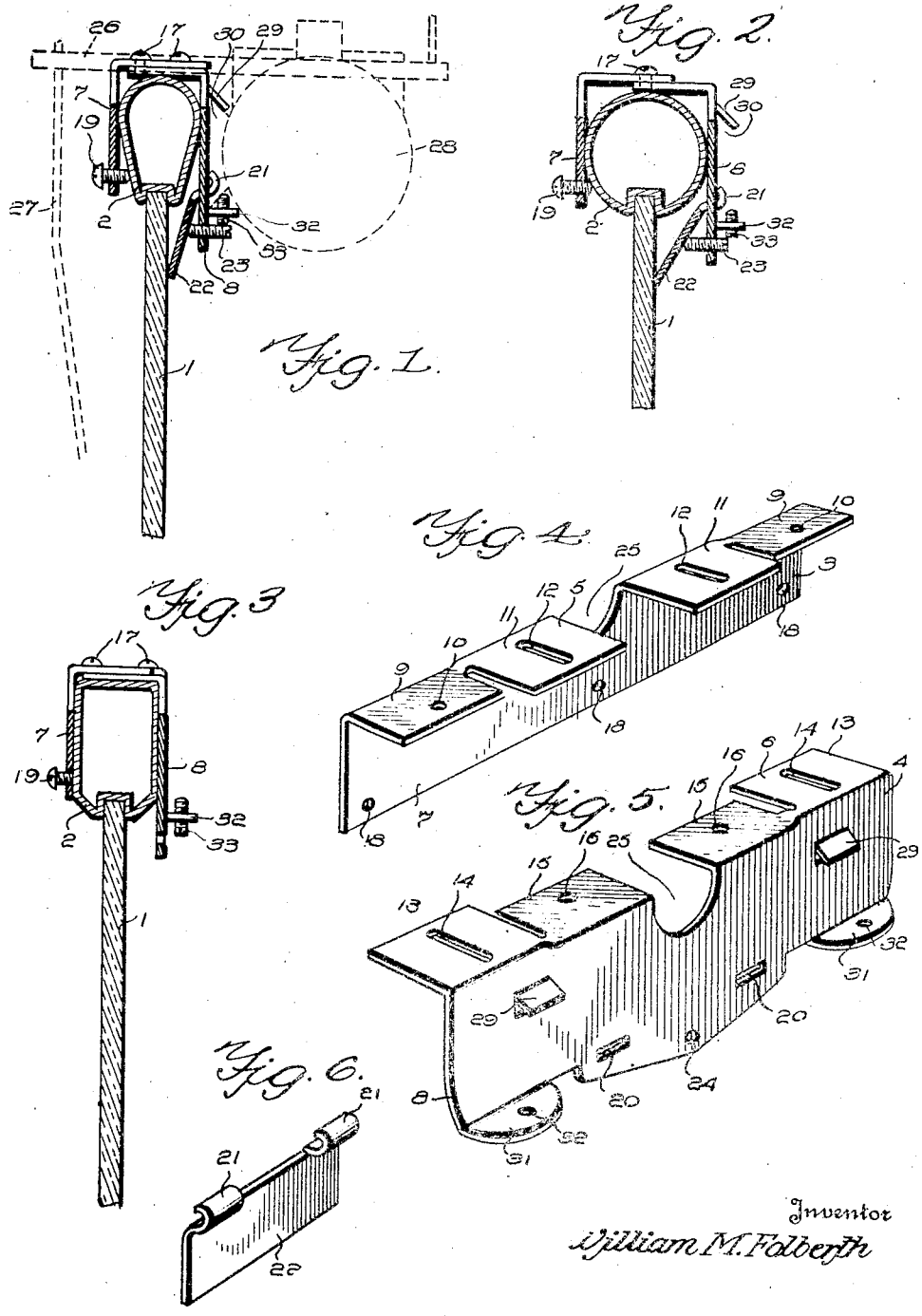

UNITED STATES PATENT OFFICE.

WILLIAM MITCHEL FOLBERTH, OF CLEVELAND, OHIO.

BRACKET.

1,394,988.   Specification of Letters Patent.   Patented Oct. 25, 1921.

Application filed January 15, 1921. Serial No. 437,537.

*To all whom it may concern:*

Be it known that I, WILLIAM M. FOLBERTH, a citizen of the United States, residing at Cleveland, in the county of Cuyahoga and State of Ohio, have invented certain new and useful Improvements in Brackets, of which the following is a specification.

This invention relates to brackets, and more particularly to brackets for windshield cleaners, whereby a cleaner may be supported on windshields of different sizes.

The bracket consists of a pair of angular members, one of which is adapted to support the operating mechanism arranged on the inside of the windshield, the two members being adjustably secured to each other and adapted to embrace the frame of the windshield. Bracing means are provided, comprising a plate secured to one of said members and adapted to engage the windshield, and means for retaining said member in engagement therewith.

In several prior patents, I have disclosed and claimed a windshield cleaner comprising suitable operating means adapted to be arranged on the inside of the windshield, and a cleaning element driven by said operating means arranged on the outside of the windshield. The entire device is adapted to be supported on the windshield frame.

I have found that the various forms and sizes of windshield frames employed in the different makes of motor vehicles renders it difficult to properly support the windshield cleaner by means of brackets heretofore employed. In the present invention, I have provided an adjustable bracket which may be used with any type of windshield frame, and is so constructed that it will embrace a windshield frame of any of the usual forms. Means are provided for securing the bracket to the frame, and a bracing plate is arranged on one of the members of the bracket adapted to engage the windshield to securely hold the bracket in position.

In the accompanying drawings, I have shown one embodiment of the invention. In this showing:

Figure 1 is a vertical sectional view through a windshield and frame, showing the bracket in position, the windshield cleaner being shown in dotted lines, Fig. 2 is a similar view showing the device applied to a windshield having a frame of different size and formation, Fig. 3 is a similar view showing the device applied to a third form of windshield, Fig. 4 is a detail perspective view of one of the bracket members, Fig. 5 is a similar view of the other member, and, Fig. 6 is a similar view of the bracing plate.

Referring to the drawings, the reference numeral 1 designates a windshield provided with a frame 2. The bracket comprises a pair of angular members 3 and 4, having upper portions 5 and 6 respectively, which are adapted to be arranged over the top of the windshield frame with the legs 7 and 8 extending downwardly on each side of the frame.

The upper portions 5 and 6 of the bracket members are each formed of a plurality of sections arranged in different planes. As shown, the upper portion 5 is provided with two depressed sections 9, arranged at each end and provided with openings 10. Adjacent the center, there is provided a pair of raised sections 11, provided with elongated slots 12. The upper portion 6 is similarly constructed with the elevated sections thereof arranged at the ends, as at 13, and provided with elongated slots 14. Adjacent the center, this portion is provided with depressed sections 15, having openings 16. It will be apparent that when the device is assembled, the elevated portions of each section rest upon the depressed portions of the opposite section to prevent vertical displacement of the parts. The bracket may be adjusted to accommodate windshield frames of various thickness by means of screws 17, passing through the openings in the depressed portions and the elongated slots in the raised or elevated portions. The range of adjustment is limited by the size of the elongated slots, but in actual practice, the adjustment obtained is sufficient to permit the use of the bracket on any type of construction of windshield frame.

Referring to Fig. 1 of the drawings, the device is applied to a windshield frame by adjusting the distance between the members 3 and 4 substantially equal to the width of the frame and placing the bracket in position. As shown, the outer member 3 is provided with a plurality of openings 18 adapted to receive set screws or similar fastening elements 19, which engage the frame 2. The inner member is provided with a pair of spaced slots 20, adapted to receive the curled extensions 21, arranged on a bracing member 22, the curled extension and the slots 20, forming a hinge. This bracing member is adapted to engage the windshield and is retained in position by means of a set screw 23, arranged in an opening 24. The bracket members are provided with registering recesses 25, extending across the top of the bracket for the reception of the operating shaft 26 of the cleaner element 27, the operating shaft being generally oscillated by the operating mechanism diagrammatically illustrated at 28. The operating mechanism is provided with a dove tail extension, whereby it is secured to the bracket member 4. As shown, the bracket member is provided with a pair of up-struck portions 29, arranged at an angle and adapted to engage the dove tail extension 30. The lower end of the bracket is provided with a pair of angularly disposed flanges 31, having openings 32 therein for the reception of set screws 33, adapted to engage the lower portion of the dove tail extension.

In Fig. 2 of the drawings, there is shown a windshield frame substantially circular in cross-section and of greater width than the windshield frame shown in Fig. 1. To apply the bracket to a windshield frame of this character, the members are adjusted a distance from each other substantially equal to the diameter of the frame, and secured thereto.

In Fig. 3 of the drawings, the bracket is shown applied to a substantially rectangular frame.

It will be apparent that the bracket may be applied to windshield frames of various sizes, and may be employed in connection with windshield frames of different cross-sections. The bracing member 22 which engages the windshield at a point below the center of gravity of the operating mechanism, steadies the bracket and windshield cleaner and prevents rattling. The recesses 25 permit the operating shaft to extend from the inside of the vehicle to the outside and operate the cleaner element 27.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A bracket for windshield cleaners comprising a pair of members adjustably secured to each other, said members being adapted to embrace the frame of a windshield, means for securing a windshield cleaner to one of said members, and bracing means carried by one of said members and adapted to engage the windshield.

2. A bracket for windshield cleaners comprising a pair of angular plates, one portion of each of said plates being arranged upon the other and adjustably secured thereto, the other portions of the plates being spaced from each other and adapted to be arranged on opposite sides of a windshield frame, and means for securing a windshield cleaner to one of said members.

3. A bracket for windshield cleaners comprising a pair of angular plates, said bracket being adapted to embrace the frame of a windshield, with one of the arms of each plate arranged upon opposite sides of the windshield, the other arm of each plate being horizontally disposed and arranged above the top of the windshield frame, said horizontally disposed arms being provided with elevated and depressed portions, the elevated portions of one arm being arranged adjacent the depressed portions of the other arm, said horizontal portions being adjustably secured to each other, and means for securing a windshield cleaner to one of said members.

4. A bracket for windshield cleaners comprising a pair of angular plates disposed on opposite sides of a windshield frame, said plates being provided with flanges adapted to be arranged above the windshield frame, means for adjustably securing said plates to each other, said plates being provided with registering recesses for the passage of the shaft of a windshield cleaner, and means for securing a windshield cleaner to one of said members.

5. A bracket for windshield cleaners comprising a pair of members, each of said members consisting of an angular plate having a vertical arm disposed on one side of the frame of a windshield, and horizontally disposed overlapping arms arranged on the top of the windshield frame, means for adjustably securing said horizontally disposed arms to each other, one of said members being provided with up-struck portions near its upper edge, and flanges arranged on the lower edge of said member whereby a windshield cleaner may be secured to said member between said up-struck portions and said flanges.

6. A bracket for windshield cleaners comprising a pair of members, each of said members, comprising an angular plate, said members being adapted to be assembled with one arm of each of said plates arranged adjacent an arm of the other plate, the other arm of each of the plates being spaced from the second arm of the other plate, means for adjustably securing said members to each other, said bracket being adapted to embrace a windshield frame with the spaced arms arranged on each side of the frame, means for securing a windshield cleaner to one of said members, and a bracing member hingedly secured to one of said members and adapted to engage the windshield to maintain said bracket in position.

In testimony whereof, I affix my signature in presence of two witnesses.

WILLIAM MITCHEL FOLBERTH.

Witnesses:
W. F. CHAPIN,
E. SCHWARM.